United States Patent [19]

Blackburn et al.

[11] Patent Number: 5,034,891
[45] Date of Patent: Jul. 23, 1991

[54] METHOD AND APPARATUS FOR SENSING A VEHICLE CRASH WITH FREQUENCY DOMAIN BOOST

[75] Inventors: Brian K. Blackburn, Rochester Hills; Scott B. Gentry, Utica, both of Mich.

[73] Assignee: TRW Vehicle Safety Systems Inc., Lyndhurst, Ohio

[21] Appl. No.: 432,139

[22] Filed: Nov. 3, 1989

[51] Int. Cl.$^5$ .............................................. B60R 21/32
[52] U.S. Cl. ............................. 364/424.05; 280/735; 180/282; 340/436; 307/10.1
[58] Field of Search ................. 180/232, 271, 282; 280/728, 734, 735, 735; 307/10.1, 10.6, 10.7; 340/436, 438; 364/424.05

[56] References Cited

U.S. PATENT DOCUMENTS

| | | | |
|---|---|---|---|
| 3,762,495 | 10/1973 | Usui et al. | 280/735 X |
| 3,870,894 | 3/1975 | Brede et al. | 180/274 X |
| 3,911,391 | 10/1975 | Held et al. | 280/735 |
| 4,293,921 | 10/1981 | Smith, Jr. | 364/726 |
| 4,386,674 | 6/1983 | Sugata | 180/282 |
| 4,408,284 | 10/1983 | Kijesky et al. | 364/485 |
| 4,410,875 | 10/1983 | Spies et al. | 280/735 X |
| 4,497,025 | 1/1985 | Hannoyer | 364/424.05 |
| 4,507,705 | 3/1985 | Hoshino et al. | 73/DIG. 1 X |
| 4,638,179 | 1/1987 | Mattes et al. | 280/735 X |
| 4,684,928 | 8/1987 | Takahashi et al. | 340/436 X |
| 4,777,605 | 10/1988 | Pilkington | 364/484 |
| 4,805,456 | 2/1989 | Howe et al. | 73/DIG. 1 X |
| 4,842,301 | 6/1989 | Feldmaier | 280/735 |
| 4,866,418 | 9/1989 | Dobler et al. | 280/735 |
| 4,950,914 | 8/1990 | Kurihara et al. | 280/735 |

OTHER PUBLICATIONS

Micromachined Silicon Accelerometers with Self-Testing Capabilities.
IC Sensor Article "A Miniature Silicon Accelerometer with Built-In Damping", by Stephen Terry.
SAE Paper No. 720035 "Comparative Analysis of Crash Sensors", by Jones, et al., Jan. 10-14, 1972.

Primary Examiner—Thomas G. Black
Assistant Examiner—Thomas S. Auchterlonie
Attorney, Agent, or Firm—Tarolli, Sundheim & Covell

[57] ABSTRACT

A method and apparatus is disclosed for controlling actuation of an air bag restraint system. The apparatus includes a sensor securable to the vehicle for providing a vibratory electric signal having various frequency components indicative of whether the vehicle is in a deployment condition. The particular frequency components indicative of a deployment condition are not present when the vehicle is in a non-deployment condition. A filter circuit is connected to the sensor for providing an electric signal having a value indicative of the value of the particular frequency components. An integrator provides a signal having a value indicative of the value of the vibratory electric signal. A summing circuit sums the value of the signal from the integrator and from the filter circuit. A signal generator provides the actuation signal when the signal from the summing circuit exceeds a predetermined value.

6 Claims, 6 Drawing Sheets

METHOD AND APPARATUS FOR SENSING A VEHICLE CRASH WITH FREQUENCY DOMAIN BOOST

TECHNICAL FIELD

The present invention is directed to an actuatable passenger restraint system for a vehicle and is particularly directed to a method and apparatus for sensing a particular, predetermined type of vehicle crash and for providing an actuation signal upon the occurrence of such a crash to actuate a passenger restraint device.

BACKGROUND

Actuatable passenger restraint systems for vehicles are well known in the art. One particular type of actuatable passenger restraint system includes an inflatable air bag mounted within the passenger compartment of the vehicle. Each air bag in the vehicle has an associated, electrically actuatable ignitor, referred to as a squib. Such systems further include an inertia sensing device for measuring the deceleration of the vehicle. When the inertia sensing device indicates that the vehicle is decelerating at a rate above a predetermined amount, an electric current of sufficient magnitude and duration is passed through the squib to ignite the squib which, in turn, ignites a combustible gas generating composition or pierces a container of pressurized gas, thereby inflating the air bag.

Many known inertia sensing devices used in actuatable passenger restraint systems are mechanical in nature. Such devices are typically mounted to the vehicle frame and include a pair of mechanically actuatable switch contacts and a resiliently biased weight. The weight is arranged such that when the vehicle is decelerated, the weight physically moves relative to its mounting. The greater the rate of deceleration, the further the weight moves against the bias force. The switch contacts are mounted relative to the biased weight such that, when the weight moves a predetermined distance, the weight moves over or against the switch contacts causing them to close. The switch contacts, when closed, connect a squib to a source of electrical energy sufficient to ignite the squib.

Still other known actuatable passenger restraint systems for vehicles include an electrical transducer or accelerometer for sensing vehicle deceleration. Such systems include a monitoring or evaluation circuit connected to the output of the transducer. Such transducers provided an electric signal having a value indicative of the vehicle's rate of deceleration. The monitoring circuit processes the transducer output signal. One typical processing technique is to integrate the transducer output signal. If the output of the integrator exceeds a predetermined value, an electrical switch is actuated to connect electrical energy to the squib. One example of such a system is disclosed in Brede, et al. U.S. Pat. No. 3,870,894 ("the '894 patent").

The '894 patent discloses a system which includes an accelerometer, an evaluation circuit connected to the accelerometer, and an ignition circuit or squib connected to an output of the evaluation circuit. The accelerometer includes a piezoelectric transducer that provides an electrical output signal having a value indicative of the vehicle deceleration. The evaluation circuit includes an integrator electrically coupled to the output of the accelerometer through an amplifier. The output of the integrator is an electrical signal having a value indicative of the integral of the deceleration signal. A trigger circuit is connected to the output of the integrator. When the output of the integrator reaches a predetermined value, the trigger circuit actuates a time delay circuit. The time delay circuit begins to time out a predetermined time period. After the time period is timed out, the air bag ignitor is energized.

It has been discovered that it is not desirable to inflate a vehicle air bag under all types of crashes to which the vehicle is subjected. It is not desirable, for example, to inflate the air bag during a low speed, "soft crash." The determination as to what occurrences fall within the definition of "soft crash" is dependent upon various factors related to the type of vehicle. If, for example, a large vehicle traveling eight miles per hour hits a parked vehicle, such a crash would be considered a "soft crash" that would not require the air bag to inflate to protect the vehicle passengers. The vehicle seat belts alone would be sufficient to provide passenger safety. During such a "soft crash," a typical accelerometer would provide an output signal indicating a rapid deceleration is occurring. In an actuatable passenger restraint system made in accordance with the '894 patent, the air bag would be inflated as soon as the predetermined speed differential occurred and the time delay circuit timed out.

Another type of electronic control arrangement for an actuatable passenger restraint system is disclosed in U.S. Pat. No. 4,842,301. The '301 patent discloses an air bag actuation circuit that monitors the acoustic emissions produced during crushing of a vehicle of a type having a welded, unit body structure with a pair of frame side rails extending longitudinally from the front of the vehicle to the back of the vehicle. Two acoustic vibration sensors, in accordance with the '301 patent, are secured as close as possible to the front of respective side rails. The output of each of the sensors is connected to a band pass filter with a frequency range of 200 KHz to 300 KHz so as to exclude lower frequency components. The output of the bandpass filters are connected to envelope detectors. The output of the envelope detectors are connected to comparators. Once the level of the acoustic vibrations in the pass band frequency exceed a value set by the comparator reference, the air bag is actuated.

SUMMARY OF THE PRESENT INVENTION

The present invention provides a new and improved method and apparatus for electrically controlling an actuatable passenger restraint system which inflates the system's air bag only upon the occurrence of a particular type of crash, one that requires the use of the air bag for protection of the vehicle passengers.

In accordance with the present invention, an apparatus is provided for providing an actuation signal for a passenger restraint system in a vehicle upon the occurrence of a predetermined type of vehicle crash condition. The apparatus comprises sensing means securable to the vehicle for providing a vibratory electric signal having various frequency components upon the occurrence of said predetermined type of crash condition. Filter means are connected to said sensing means for providing a signal having a value when said sensing means provides a signal that includes particular frequency components which have been empirically determined to be indicative of the vehicle being in said predetermined type of vehicle crash condition. An integrator connected to said sensing means provides an electrical signal indicative of the integral of the signal provided by said sensing means. The apparatus further includes a summing circuit connected to an output of said filter means and an output of said integrator means for providing a signal indicative of the value of the sum of the signal from said filter means and from said integrator means. A signal generator means provides said actuation signal when the signal from said summing circuit exceeds a predetermined value.

A method, in accordance with the present invention, for providing an actuation signal for a passenger restraint system in a vehicle upon the occurrence of an a predetermined actuatable condition, said method comprising the steps of providing a vibratory electric signal having various frequency components upon the occurrence of said predetermined type of crash condition filtering the vibratory electric signal and providing a signal having a value when particular frequency components are present that have been empirically determined to be indicative of the vehicle being in said predetermined type of vehicle crash condition, integrating said vibratory electric signal and providing an electrical signal indicative of the integral of the vibratory electric signal, summing the filtered signal and the integral and providing a signal indicative of the value of the sum, and providing said actuation signal when the summation exceeds a predetermined value.

In accordance with a preferred embodiment of the present invention an apparatus is provided for providing an actuation signal for a passenger restraint system in a vehicle upon the occurrence of a predetermined type of vehicle crash condition. The apparatus comprises sensing means securable to the vehicle for providing a vibratory electric signal having various frequency components upon the occurrence of a vehicle crash condition. Filter means are connected to said sensing means for providing a signal having a value when said sensing means provides particular frequency components which have been empirically determined to be indicative of the vehicle being in said predetermined type of vehicle crash condition. An integrator connected to said sensing means provides an electrical signal indicative of the integral of the signal provided by said sensing means. The apparatus further includes a summing circuit connected to an output of said filter means and an output of said integrator means for providing a signal indicative of the value of the sum of the signal from said filter means and from said integrator means. A signal generator means provides said actuation signal when the signal from said summing circuit exceeds a predetermined value. The sensing means is a mass suspended by cantilever members from a frame secured to the vehicle so that when the vehicle is subjected to a crash condition, said mass vibrates, said sensing means further including resistive elements operatively coupled to said cantilever members, the resistance value of said resistive elements varying as said mass vibrates. The filter means includes a bandpass filter connected to an output of said sensing means for passing electric signals from said sensing means having said particular frequency components indicative of said predetermined type of vehicle crash condition, said filter means further including an envelope detector for providing a voltage value responsive to the passed frequency components. The signal generating means is a one-shot. The passenger restraint system is an air bag.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DETAILED DESCRIPTION OF THE PREFERRED EMBODIMENT

Figure 1:
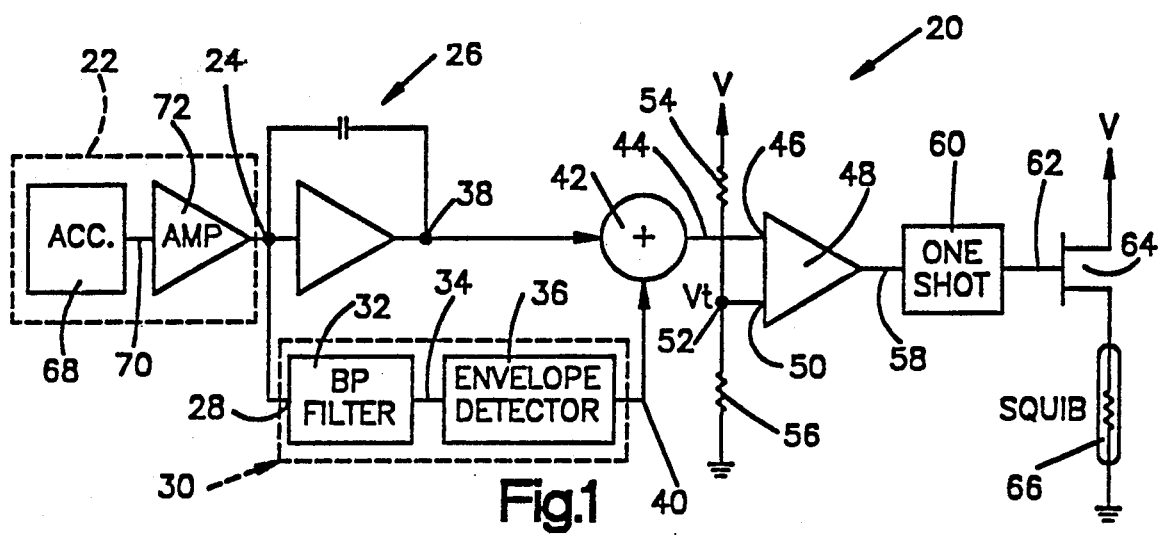
FIG. 1 is a schematic diagram of an apparatus for controlling actuation of a vehicle restraint system in accordance with the present invention.

FIG. 1 schematically depicts an apparatus 20 for use in controlling actuation of an air-bag restraint system. An accelerometer assembly 22 is securable to the vehicle and provides a vibratory electric output signal having frequency components indicative of the type of crash condition to which the vehicle is subjected. The output 24 is connected to an integrator circuit 26 of a type well known in the art. The output 24 of the accelerometer assembly 22 is also connected to the input terminal 28 of a boost circuit 30. The boost circuit 30 includes a bandpass filter 32 designed for passing frequency components within a particular frequency band that are present in the output signal 24 of the accelerometer assembly 22. An output 34 of the bandpass filter 32 is connected to an envelope detector circuit 36. An output 38 of the integrator 26 and an output 40 of the envelope detector 36 are both connected to a summing circuit 42.

An output 44 of the summing circuit 42 is connected to one input 46 of a comparator 48. Another input 50 of comparator 48 is connected to a junction 52 of a voltage dividing network including series connected resistors 54, 56 connected between a source of electrical energy V and electrical ground.

An output 58 of the comparator 48 is connected a one-shot 60. The one-shot 60 provides a pulse signal 62 having a predetermined time duration when the comparator senses that the output voltage 44 is greater than the voltage value at the junction 52. This pulse indicates that the vehicle is subjected to a crash condition for which it is desired to actuate the passenger restraint system. For the purposes of explanation, the passenger restraint system discussed herein is an air bag.

The output 62 of the one-shot 60 is connected to an electric switch 64, such as a field effect transistor ("FET"). The switch 64 is connected in series with a squib 66 between a source of electrical energy V and electrical ground. The one-shot pulse length is selected so as to insure that electrical current is supplied to the squib 66 for a duration that exceeds the manufacturer's specified minimum time period to insure actuation. Upon firing of the squib 66, the air bag is deployed.

The accelerometer assembly 22 includes an accelerometer transducer 68 that outputs a vibratory electric signal 70 having frequency components indicative of a particular type of vehicle crash condition. The output 70 of the accelerometer transducer 68 is connected to an amplifier 72 that amplifies the signal 70 and provides the output signal 24.

Figure 2:
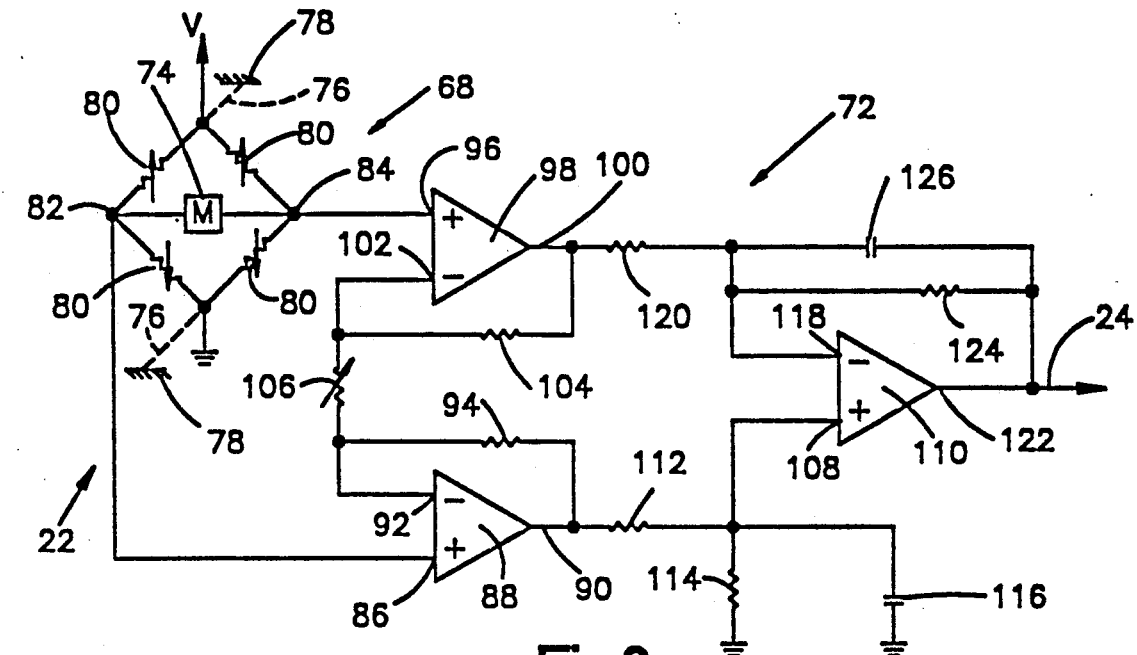
FIG. 2 is a schematic diagram of the accelerometer assembly shown in FIG. 1.

Referring to FIG. 2, the accelerometer 68 includes a mass 74 suspended by a cantilever support arrangement 76 secured to a housing 78. The housing 78 is securable to the vehicle. Four variable resistors 80 are mounted to the cantilever support arrangement. The resistors 80 are electrically connected in a Wheatstone bridge configuration between electrical ground and a source of electrical energy V.

When the mass 74 of the accelerometer 68 moves relative to its housing 78, as happens during a vehicle crash, the resistance values of the resistors 80 change. Because of the Wheatstone bridge configuration, a voltage variation occurs across terminals 82, 84 which is indicative of the movement of the mass 74. Such a transducer or accelerometer is available commercially from ICSensors, 1701 McCarthy Blvd., Milpitas, California 95035 under Model No. 3021.

The bridge resistors 80 are connected to amplifier 72 which provides the output signal 24 having a value indicative of the movement of the mass 74. Specifically, terminal 82 is connected to a non-inverting input 86 of an operational amplifier ("op amp") 88. The output 90 of op amp 88 is connected to its inverting input 92 through feedback resistor 94. Terminal 84 is connected to a non-inverting input 96 of an op amp 98. The output 100 of the op amp 98 is connected to its inverting input 102 through a feedback resistor 104. The inverting input 92 of op amp 88 and the inverting input 102 of op amp 98 are connected together through a variable resistor 106.

The output 90 of the op amp 88 is also connected to the non-inverting input 108 of op amp 110 through a resistor dividing network including resistors 112, 114. A filter capacitor 116 is connected between the junction of resistors 112, 114 and electrical ground. The output 100 of op amp 98 is also connected to the inverting input 118 of op amp 110 through a resistor 120. The output 122 of op amp 110 is connected to its inverting input 118 through parallel connected resistor 124 and capacitor 126.

If the resistors 94, 104, 112, 114, 120, and 124 have equal resistance values, designated as R, and if the value of the variable resistor 106 is designated Rvar, the gain "G" of the amplifier 72 is given by:

$$G = (1 + (2R/Rvar))$$

Figure 3:
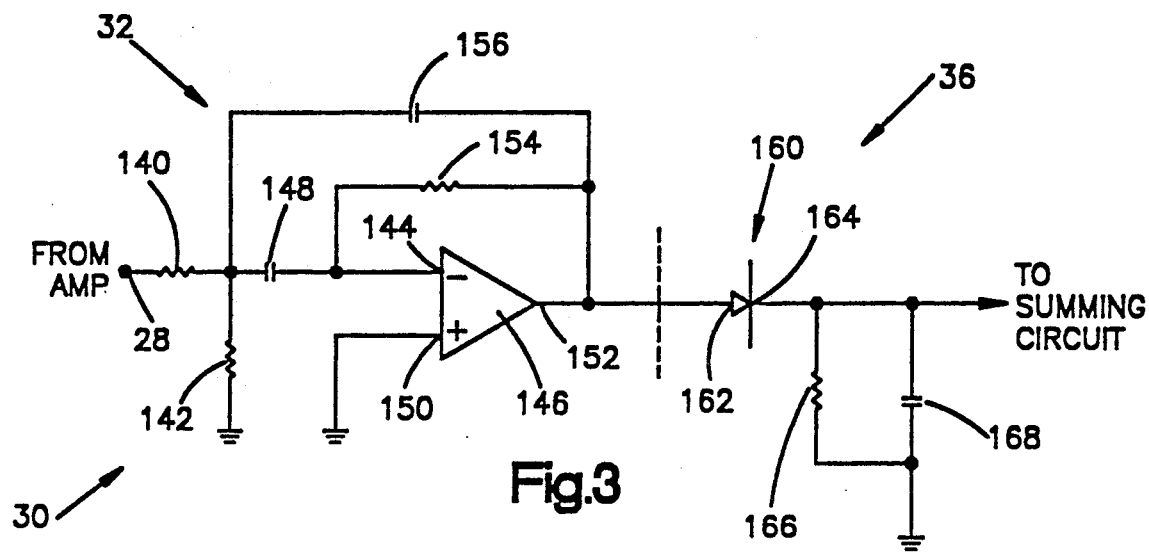
FIG. 3 is a schematic diagram of a band-pass filter and envelope detector shown in FIG. 1.

The boost circuit 30 of FIG. 1 is shown in detail in FIG. 3. The band-pass filter 32 includes the input terminal 28 which is connected to the output 24 of the amplifier 72. The amplitude of the input signal is divided by series connected resistors 140, 142. The junction of the resistors 140, 142 is connected to an inverting input 144 of an op amp 146 through a capacitor 148. The non-inverting input 150 of the op amp 146 is connected to electrical ground. The output 152 of the op amp is connected to the inverting input 144 through a resistor 154. The junction of the resistors 140, 142 is connected to the output 152 of the op amp 146 through a capacitor 156.

When selecting the component values for the band-pass filter 32, a frequency F is selected half way between the values f1 and f2 which define a frequency band limit for which the filter is to pass. A value Q is set equal to the value F divided by the frequency band width that is 3 db down from the peak value of the frequency F. The value of resistor 140 is designated R140. All other resistor values are similarly designated, i.e., RXXX where XXX is the resistor number from the drawing. The value of capacitor 148 is designated C148. The value of other capacitors are similarly designated, i.e., CXXX where XXX is the capacitor number from the drawing. The frequency F can be expressed as:

$$F = (\tfrac{1}{2}\pi) \cdot [(R154 \times C148 \times C156)) \times ((1/R140) + (1/R142))]^{\tfrac{1}{2}}$$

The gain G of the band-pass filter 32 can be express as:

$$G = R154/[R140 \times (1 + (C156/C148))]$$

The values of the resistors are then determined by:

$$R140 = Q/(G \times C156 \times 2\pi \times F)$$

$$R142 = Q/[((2 \times Q^2) - G) \times C156 \times 2\pi \times F]$$

$$R154 = (2 \times Q)/(C156 \times 2\pi \times F)$$

The envelope detector circuit 36 includes a diode 160 having its anode 162 connected to the output 152 of the bandpass filter 32. The cathode 164 of the diode 160 is connected to parallel connected resistor 166 and capacitor 168.

Figure 4:
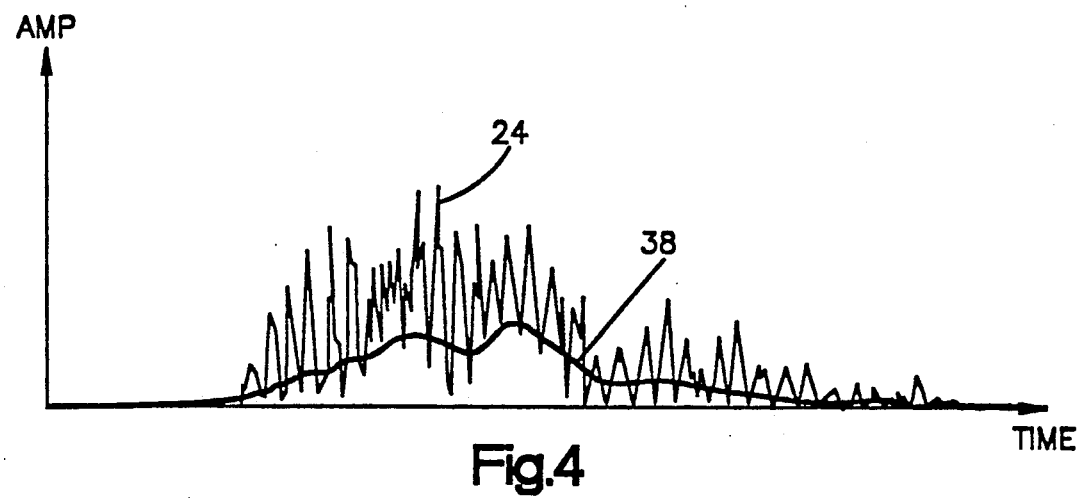
FIG. 4 is a graphical representation of the output of the accelerometer assembly when the vehicle is subjected to a non-deployment, barrier crash.
Figure 5:
FIG. 5 is a graphical representation of the Fourier transform of the output signal shown in FIG. 4.

Referring to FIG. 4, the output 24 of the accelerometer assembly 22 is graphically depicted with amplitude on the y-axis and time on the x-axis for a non-deployment crash. The rough appearance to the graph of the output signal 24 is due to the vibrations of the mass 74 during the vehicle crash. The output 38 of the integrator 26 is also depicted. FIG. 5 graphically depicts the Fourier transform of the accelerometer signal depicted in FIG. 4. Amplitude is on the y-axis and frequency is on the x-axis. The Fourier transform transforms the time domain output signal from the accelerometer assembly 22 into a frequency domain signal. The Fourier transform provides an indication as to what frequency components are present in the time domain signal. It has been discovered that the output 24 of the accelerometer assembly 22 includes particular frequency components that identify the particular type of vehicle crash to which the vehicle is subjected.

Figure 6:
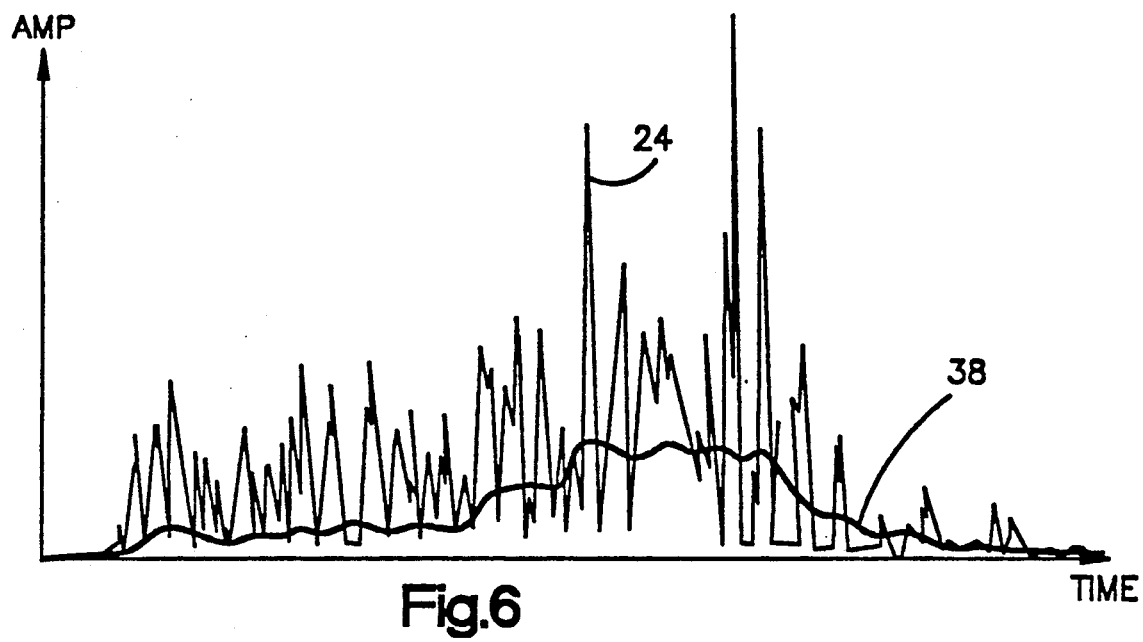
FIG. 6 is a graphical representation of the output of the accelerometer assembly when the vehicle is subjected to a long velocity change, deployment crash condition.
Figure 7:
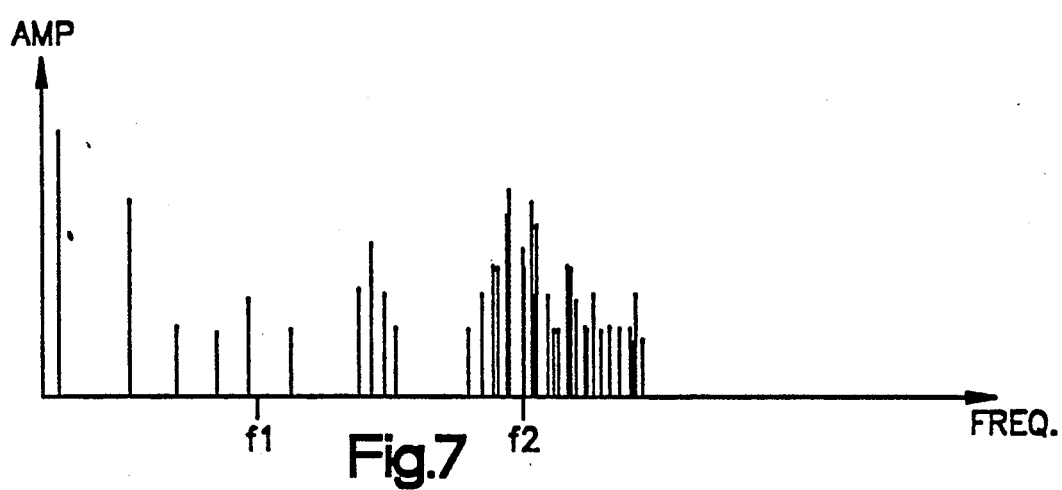
FIG. 7 is a graphical representation of the Fourier transform of the accelerometer output shown in FIG. 6.

As can be seen in FIG. 5, no frequency components are present between frequency values f1 and f2. By no frequency components being present, it is meant that frequency components between values f1 and f2 have amplitudes less than a predetermined value or have no significant value relative to the amplitude of the frequency components that are present elsewhere in the spectrum. Referring to FIGS. 6 and 7, the time domain graph and the frequency domain graph of a deployment crash are depicted, respectively. As can be seen in FIG. 7, the deployment crash does have frequency components present between the values f1 and f2.

It has been further discovered that if one could determine for a particular type of vehicle of concern which frequency components are present during a deployment crash and are not present during a non-deployment crash, one could continuously monitor the output 24 for those frequency components and actuate the air bag upon detection of those frequencies.

Figure 8:
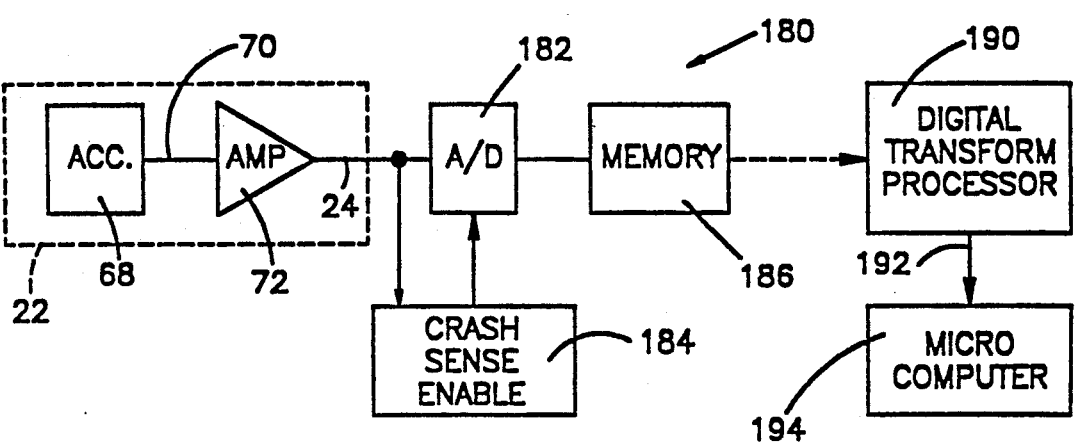
FIG. 8 is a schematic block diagram showing a hardware arrangement to obtain empirical data in accordance with the present invention.

Referring to FIG. 8, an apparatus 180 is shown for determining frequency components that are provided by the accelerometer assembly 22 attached to a vehicle during different types of crash conditions, i.e., deployment and non-deployment crashes, to which the vehicle is subjected. A deployment crash is one in which it is desirable to deploy the air bag. A non-deployment crash is one in which it is not desirable to deploy the air bag.

The accelerometer assembly 22 is exactly as described above. The output 24 of the accelerometer assembly 22 is connected to an analog-to-digital ("A/D") converter 182. A crash sensor enable circuit 184 is connected to the output 24 of the accelerometer assembly 22 and to the A/D converter 182. The crash sensor enable circuit 184 monitors the accelerometer signal 24. When the magnitude of the signal 24 is greater than a predetermined value, the crash sensor enable circuit 184 enables the A/D converter to begin conversion. The converted data is stored in a memory device 186.

After test data is acquired and stored, the data is subsequently processed by a digital transform processor 190. The digital transform processor 190 may take one of several forms, such as a Fourier transformer, a cosine transformer, or one of other several types known in the art. The output 192 of the transformer 190 is connected to a microcomputer 194. The microcomputer 194 correlates the particulars of the crash parameters, i.e., whether the crash was under deployment conditions or non-deployment conditions, with the determined frequencies detected by the digital transform processor. The microcomputer 194 then identifies which frequency components are present during a deployment crash condition and not present during a non-deployment crash condition. Alternatively, the output of the digital transform processor can be displayed on an oscilloscope. From the display of the transform data for both a deployment and a non-deployment crash condition, it can be ascertained by an observer which frequencies are present during a deployment crash condition that are not present during a non-deployment condition.

It is contemplated that the accelerometer assembly 22, the A/D converter 182, the crash sense enable circuit 184, and the memory 186 would be on board the vehicle being tested. The digital transform processor 190 and microcomputer 192 would be out board of the vehicle. After the vehicle is crashed and the data is stored in the memory 186, the digital transform processor 190 could then be connected to the memory 186 for further processing and analysis.

Figure 9:
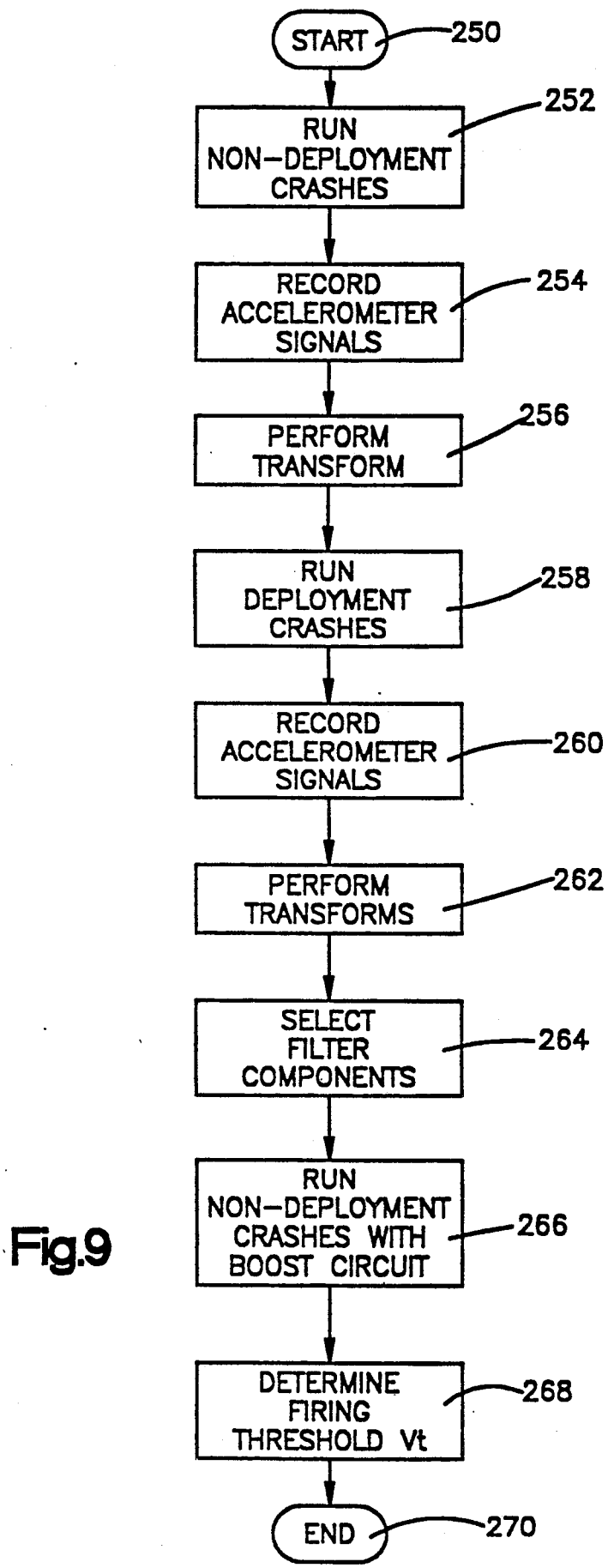
FIG. 9 is a flow diagram showing the control process for determining frequency components during vehicle crashes.

FIG. 9 depicts a flow chart of the control process in accordance with the present invention for obtaining the frequency components for deployment and non-deployment crashes for a vehicle. It is contemplated that the control process will be followed for each make and model of vehicle. This is necessary because the frequency components for the same type of crash condition may vary dependent upon the vehicle type or class. Step 250 starts the control process. In step 252, a vehicle of the particular type is crashed at non-deployment conditions, such as a eight mile per hour barrier crash. The accelerometer assembly output signal 24 for the non-deployment crash condition run in step 252 is recorded in step 254. The output signal 24 from the accelerometer assembly 22 during such a non-deployment crash condition are depicted in the graph of FIG. 4. In step 256, a Fourier transform is performed on the non-deployment crash data recorded in memory 184. The transform data is depicted in the graph of FIG. 5. As can be seen from the graph of FIG. 5, no significant frequency components are present for the frequency band between frequency f1 and frequency f2.

In step 258, the same type of vehicle is crashed at deployment conditions such as a low speed pose crash. The accelerometer assembly output signal 24 for the deployment crash condition run in step 258 is recorded in step 260. The output signal 24 from the accelerometer assembly 22 during such a deployment crash condition is depicted in the graph of FIG. 6. In step 262, the Fourier transform is performed on the stored deployment crash data. The transform data is depicted in the graph of FIG. 7. As can be seen from the graph of FIG. 7, significant frequency components are present for the frequency band between frequency f1 and frequency f2. Based upon this information, a band pass filter is designed in step 264 for the frequency band so as to pass signals present between frequency f1 and frequency f2. The component values for the band pass filter are determined according to the equations discussed above.

Figure 10:
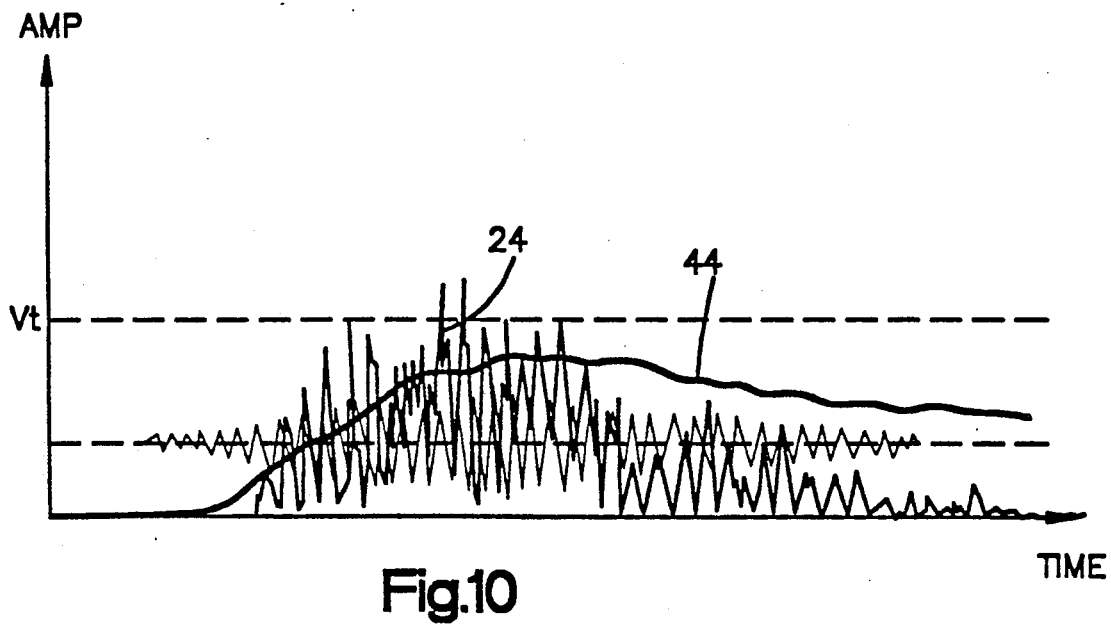
FIG. 10 is a graphical representation of the output signal from the accelerometer during a non-deployment barrier crash overlaid with the output of the summation circuit shown in FIG. 1 and with the output of the bandpass filter shown in FIG. 1 but off-set for clarity.
Figure 11:
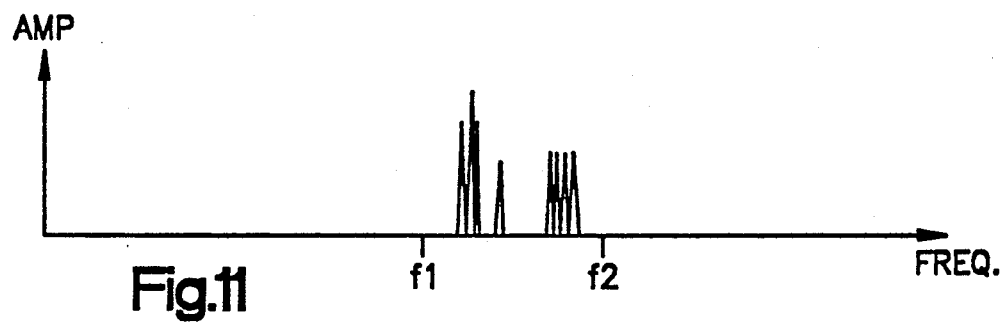
FIG. 11 is a graphical representation of the Fourier transform of the bandpass filter output shown in FIG. 10.

Referring to FIGS. 4 and 6, the output 38 of the integrator 26 is shown for both a non-deployment crash condition (FIG. 4) and for a deployment crash condition (FIG. 6). FIG. 10 depicts the same non-deployment crash as depicted in FIG. 4. Also depicted in FIG. 10 is the output 34 of the bandpass filter 32 and output 44 of the summing circuit 42, which is the sum of the output of the integrator circuit 26 and the boost circuit 30. The output of the bandpass filter 32 is shown offset on the y-axis for purposes of clarity. A threshold value Vt is selected which, for all non-deployment crash conditions, will be greater than the value of the output 44. Running non-deployment crash conditions with the boost circuit is depicted in FIG. 9 at step 266. The Fourier transform of the bandpass filter output is shown in FIG. 11. Between frequencies f1 and f2, there are few frequency components present. These frequency components are insignificant in magnitude as compared to the output of the bandpass filter during a deployment crash condition. Selecting the value of a threshold value Vt is depicted in step 268 of FIG. 9. Based upon the selected value Vt, the resistive values of resistors 54, 56 are selected so that the voltage at the junction 52 is equal to Vt. The method of determining which frequency components are present during non-deployment and deployment crash condition, the designing of the bandpass filter based upon this information, and the selection of a firing threshold is completed in step 270 of FIG. 9.

Figure 12:
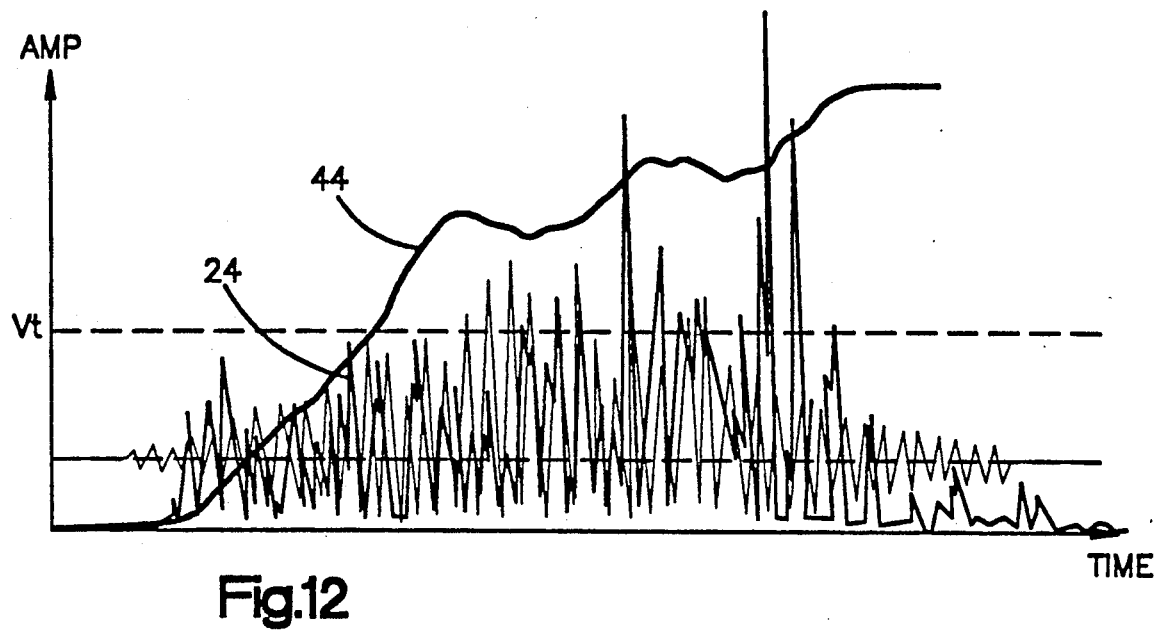
FIG. 12 is a graphical representation of the output of the accelerometer assembly overlaid with the output of the summation circuit shown in FIG. 1 and with the output of the bandpass filter shown in FIG. 1 but off-set for clarity.
Figure 13:
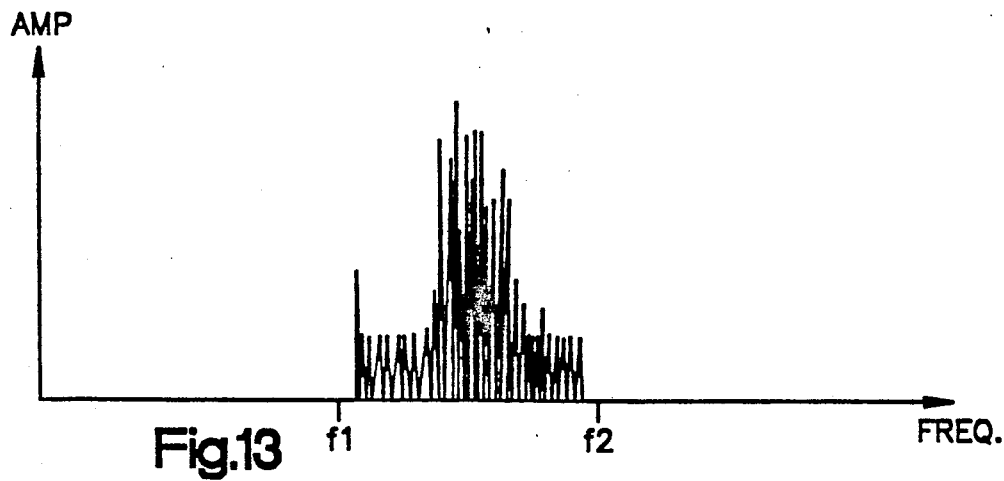
FIG. 13 is a graphical representation of the Fourier transform of the output of the bandpass filter shown in FIG. 12.

Referring to FIG. 12, the output 24 of the accelerometer assembly 22 is depicted during the same deployment crash condition shown in FIG. 6. The output 34 of the bandpass filter 32 and the output 44 of the summing circuit 42 are also depicted. FIG. 13 depicts the Fourier transform of the bandpass filter 32 for this deployment crash occurrence. There are frequency components present between frequencies f1 and f2 having a significant magnitude relative to the values shown in FIG. 11. It should be appreciated that, as a result of the boost circuit 30, the output 44 of the summing circuit 42 rises very rapidly as compared to the output of the integrator circuit alone.

The apparatus schematically shown in FIG. 1, which is made in accordance with the present invention, permits the distinction between a deployment crash condition having a long velocity change pulse and a non-deployment low speed barrier crash condition to better control the actuation of the air bag. Also, the arrangement, in accordance with the present invention, acts to filter out certain occurrences for which it is not desirable to actuate the air bag. For example, if the vehicle was subject to a high frequency hammer blow, those frequencies would be filtered out by the bandpass filter. The integrator output would not change from a hammer blow due to the short duration of the occurrence of the event.

Figure 14:
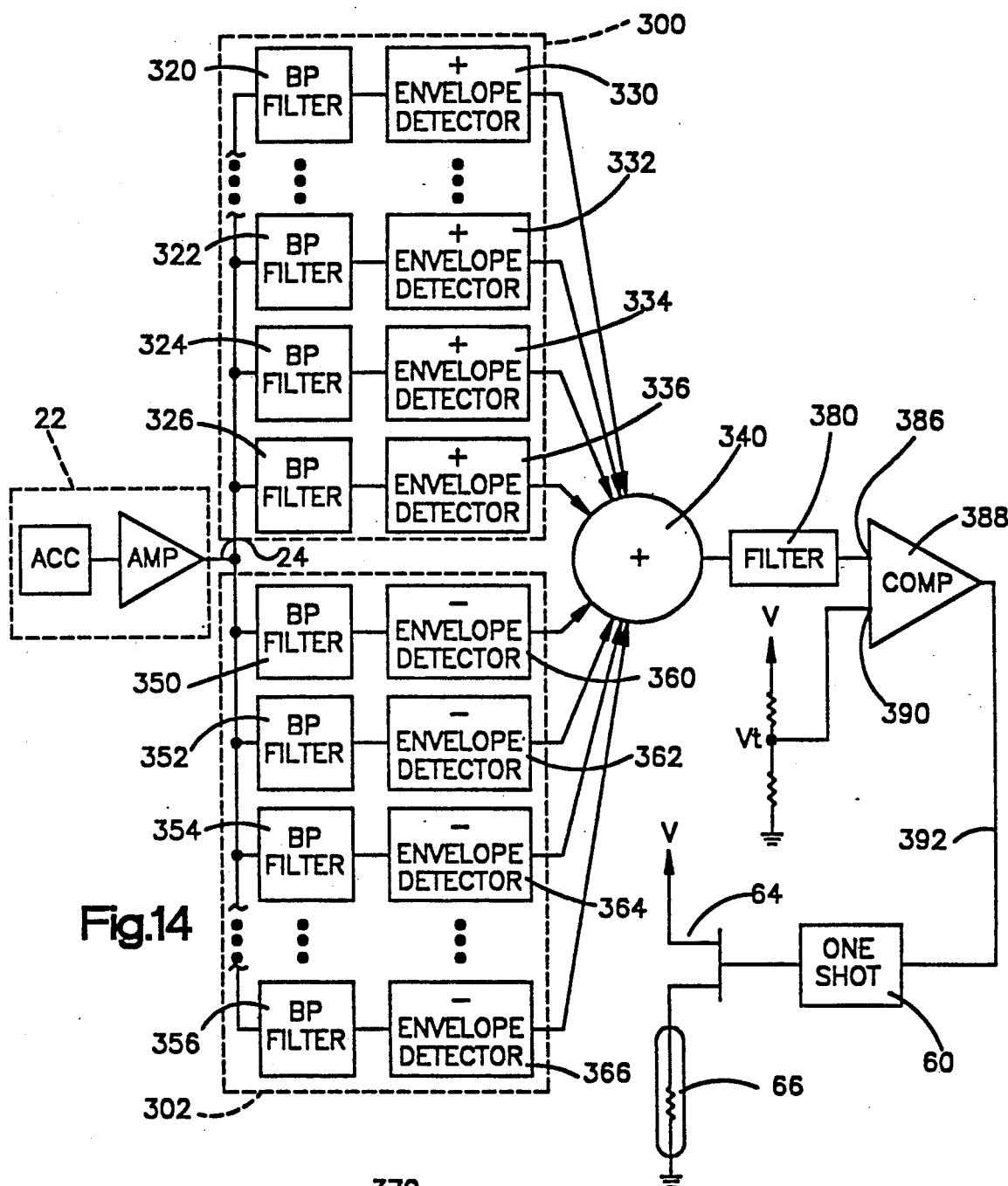
FIG. 14 is an apparatus for controlling actuation of a passenger restraint system made in accordance with another embodiment of the present invention.

Referring to FIG. 14, another embodiment of the present invention is schematically depicted. An accelerometer assembly 22 having an output 24 is provided and is the same as described above. The output 24 of the accelerometer assembly 22 is connected to deployment circuitry 300 and non-deployment circuitry 302. It has been discovered that when a particular type of vehicle is subjected to a plurality of different types of non-deployment crash conditions, certain frequency components are present that are not present during deployment crash conditions. Conversely, it has been discovered that when a particular type of vehicle is subjected to a plurality of different types of deployment crash conditions, certain frequency components are present that are not present during non-deployment crash conditions. Based on this discovery, it has been determined that control of the passenger restraint system can be controlled by evaluating a plurality of discrete frequency bands during a vehicle crash. Control of the air bag is responsive to whether there are more deployment frequency components present or more non-deployment frequency components present.

The deployment circuitry 300 include a plurality of bandpass filters 320, 322, 324, 326 all connected to the output 24 of the accelerometer assembly 22. The frequencies to be passed by the bandpass filters of the deployment sensors are determined using the empirical technique described above by crashing the same type of vehicle at several different deployment conditions and noting which frequency components are present for deployment conditions, but not present for non-deployment crash conditions. Positive envelope detectors 330, 332, 334, 336, are respectively connected to the bandpass filters 320, 322, 324, 326. The outputs of the envelope detectors 330, 332, 334, 336 are connected to a summing circuit 340.

The non-deployment circuitry 302 include a plurality of bandpass filters 350, 352, 354, 356 all connected to the output 24 of the accelerometer assembly 22. The frequencies to be passed by the bandpass filters of the non-deployment sensors are determined using the empirical technique described above by crashing the same type of vehicle at several different non-deployment conditions and noting which frequency components are present for non-deployment conditions but not present for deployment crash conditions. Negative envelope detectors 360, 362, 364, 366, are respectively connected to the bandpass filters 350, 352, 354, 356. The outputs of the envelope detectors 360, 362, 364, 366 are connected to the summing circuit 340.

Figure 15:
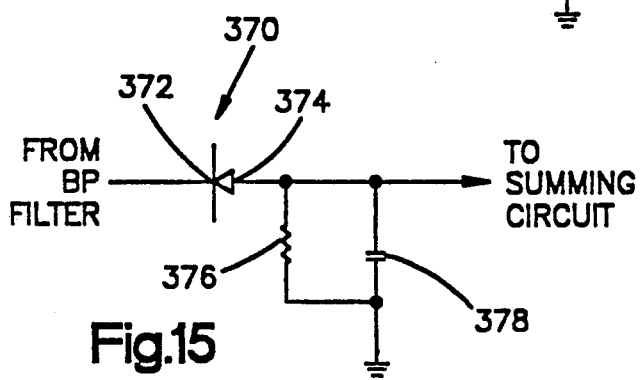
FIG. 15 is a schematic of the negative envelope detectors shown in FIG. 14.

FIG. 15 schematically depicts a negative envelope detector of the type contemplated for use in the non-deployment circuitry 302. The negative envelope detector includes a diode 370 having its cathode 372 connected to the output of a non-deployment bandpass filter. The anode 374 of the diode 370 is connected to a parallel combination of resistor 376 and capacitor 378. The anode 374 is connected to the summing circuit 340.

When a signal is provided from the accelerometer assembly 22 as during a vehicle crash, frequencies that may be present indicative of a non-deployment condition or of a deployment condition are passed by the appropriate bandpass filters. The resultant summation is filtered by a filter circuit 380. The output of the filter 380 is connected to an input 386 of a comparator 388. The other input 390 of the comparator 388 is connected to a reference voltage Vt as was described above. The output 392 of the comparator 388 is connected to a one-shot 60 as described above. When the presence of deployment frequency components minus the presence of any non-deployment frequency components exceeds the value Vt, the squib is actuated.

As should be appreciated, the embodiment of FIG. 14 reduces the need for or, if the number of deployment bandpass filters and the non-bandpass filters is sufficient enough, eliminates the need for an integrator. The arrangement shown in FIG. 14, although not shown as being connected in parallel with an integrator, can be so connected.

It is contemplated that all the band pass filters for the different embodiments described in this specification would be passing frequency components of less than 3 KHz.

This invention has been described with reference to preferred embodiments. Modifications and alterations may occur to others upon reading and understanding this specification. For example, the boost circuit shown in FIG. 1 could be replaced with a deletion circuit that would monitor the accelerometer output signal for the presence of frequency components indicative of a non-deployment condition. This deletion circuit would subtract from the integrator signal to prevent a false indication of a deployment condition. Also, the preferred embodiment has been described with regard to actuation of an air bag restraint system. The method and apparatus of the present invention is just as applicable to other passenger restraint system. For example, the actuation signal can be used to lock a seat belt in a lockable seat belt system or to actuate a pretensioner for a seat belt retractor in a seat belt system. It is our intention to include all such modifications and alterations insofar as they come within the scope of the appended claims and the equivalents thereof.

Having fully described our invention, we claim:

1. An apparatus for providing an actuation signal for a passenger restraint system in a vehicle upon the occurrence of a predetermined type of vehicle crash condition, said apparatus comprising:

sensing means securable to the vehicle for providing a vibratory electric signal having various frequency components upon the occurrence of a vehicle crash condition;

filter means connected to said sensing means providing a signal having a positive voltage value when said sensing means provides a signal that includes particular frequency components which have been empirically determined to be indicative of the vehicle being in said predetermined type of vehicle crash condition;

integrator means connected to said sensing means for providing an electrical signal indicative of the integral of said signal provided by said sensing means;

summing circuit connected to an output of said filter means and an output of said integrator means for providing a signal indicative of the value of the sum of said positive voltage value signal from said filter means and said signal from said integrator means, said positive voltage value signal from said filter means boosting said signal from said summing circuit; and signal generator means for providing said actuation signal when said signal from said summing circuit exceeds a predetermined value.

2. The apparatus of claim 1 wherein said sensing means is a mass suspended by cantilever members from a frame secured to the vehicle so that when the vehicle is subjected to a crash condition, said mass vibrates, said sensing means further including resistive elements operatively coupled to said cantilever members, the resistance value of each of said resistive elements varying as said mass vibrates.

3. The apparatus of claim 2 wherein said filter means includes a bandpass filter connected to an output of said sensing means for passing electric signals from said sensing means having said particular frequency components indicative of said predetermined type of vehicle crash condition, said filter means further including an envelope detector for providing a said positive voltage value responsive to the passed frequency components.

4. The apparatus of claim 1 wherein said signal generating means is a one-shot.

5. The apparatus of claim 1 wherein said passenger restraint system includes an air bag.

6. A method for providing an actuation signal for a passenger restraint system in a vehicle upon the occurrence of a predetermined type of vehicle crash condition, said method comprising the steps of:

providing a vibratory electric signal having various frequency components upon the occurrence of a vehicle crash condition;

filtering said vibratory electric signal and providing a signal having a positive voltage value when particular frequency components are present that have been empirically determined to be indicative of the vehicle being in said predetermined type of vehicle crash condition;

integrating said vibratory electric signal and providing an electrical signal indicative of the integral of said vibratory electric signal;

summing said positive voltage value signal and said integral and providing a signal indicative of the value of the sum, said positive voltage value signal boosting said summation; and providing said actuation signal when said summation exceeds a predetermined value.

* * * * *